United States Patent
Porikli et al.

(10) Patent No.: US 8,224,072 B2
(45) Date of Patent: Jul. 17, 2012

(54) METHOD FOR NORMALIZING DISPLACEABLE FEATURES OF OBJECTS IN IMAGES

(75) Inventors: Fatih M. Porikli, Watertown, MA (US); Mohamed E. Hussein, Greenbelt, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 624 days.

(21) Appl. No.: 12/504,407

(22) Filed: Jul. 16, 2009

(65) Prior Publication Data

US 2011/0013804 A1 Jan. 20, 2011

(51) Int. Cl.
*G06K 9/62* (2006.01)

(52) U.S. Cl. ........ 382/159; 382/170; 382/164; 382/173; 382/190; 382/224; 382/225; 382/228; 382/254; 707/2; 707/3; 707/723; 707/741

(58) Field of Classification Search ................. 382/159, 382/170, 164, 173, 190, 224, 225, 228, 254; 707/2, 3, 5, 723, 741
See application file for complete search history.

(56) References Cited

U.S. PATENT DOCUMENTS

| 8,111,923 B2* | 2/2012 | Csurka et al. ................. 382/190 |
| 2007/0237387 A1 | 10/2007 | Avidan | |

OTHER PUBLICATIONS

Mikolajczyk et al., "Human detection based on a probabilistic assembly of robust part detectors," Proc. European Conf. on Computer Vision, vol. 1, pp. 69-81, 2004.

Mohan et al., "Example-based object detection in images by components," IEEE Trans. Pattern Anal. Machine Intell., 23(4):349-360, 2001.

Felzenszwalb et al., "Pictorial structures for object recognition," Intl. J. of Computer Vision, vol. 61, 2005; and Felzenszwalb et al., "A discriminatively trained, multiscale, deformable part model," Proc. IEEE Conf. on Computer Vision, 20089.

* cited by examiner

*Primary Examiner* — Mike Rahmjoo
(74) *Attorney, Agent, or Firm* — Dirk Brinkman; Gene Vinokur

(57) ABSTRACT

A method normalizes a feature of an object in an image. The feature of the object is extracted from a 2D or 3D image. The feature is displaceable within a displacement zone in the object, and wherein the feature has a location within the displacement zone. An associated description of the feature is determined. Then, the feature is displaced to a best location in the displacement zone to produce a normalized feature.

18 Claims, 3 Drawing Sheets

METHOD FOR NORMALIZING DISPLACEABLE FEATURES OF OBJECTS IN IMAGES

FIELD OF THE INVENTION

This invention relates generally computer vision, and more particularly to feature based processing of images.

BACKGROUND OF THE INVENTION

Many computer vision applications, such as object detecting, recognizing, classifying and tracking rely on significant features of the objects. For example, in face recognition, the features associated with the eyes, nose and mouth are most relevant. In tracking an articulated object, such as a person, the important features are associated with the torso, limbs and head. Typically, the feature is defined by its size, location and descriptor. Because the appearance of the features can change drastically depending on lighting, motion, texture, pose variation, and occlusions, feature-based models are often constructed to improve the processing. Images can also be acquired from different viewpoints, which cause objects to appear to have different properties, such as size and speed, depending on their position in the image and the viewpoint characteristics.

To facilitate the processing arbitrary images of objects, two normalization preprocessing steps are usually performed.

Image Normalization

First, the image is normalized. Image normalization makes the number of pixels and aspect ratios the same in all images, e.g., 40×40 for faces, and 128×64 for bodies. The range of pixel intensity values can also be adjusted by contrast stretching and dynamic range expansion to e.g., 0-255. Colors can also be adjusted.

Object Normalization

Second, the object is normalized to fit in the normalized image. This can be done by making the size, location and orientation of the object consistent in all images. This can be done by scaling, translation and rotation.

However, even though the features may appear to relocate during the prior art image and object normalizations, the relative location and the description of the features within the image or object, with respect to each other, remain fixed.

Deformable and Articulated Objects

Alternative solutions segment a deformable or articulated object into multiple objects. For example, for a human body, the object is segmented into torso, head and limbs objects. Similarly, a face can be a segmented into eye, nose and mouth objects. Those methods then operate on the fixed feature in each object, and displacement of the feature within the object is not an issue, i.e., the features in the objects remain fixed in place. In fact, the entire object segment is usually treated as a feature see Mikolajczyk et al., "Human detection based on a probabilistic assembly of robust part detectors," Proc. European Conf. on Computer Vision, volume 1, pages 69-81, 2004, Mohan et al., "Example-based object detection in images by components," IEEE Trans. Pattern Anal. Machine Intell., 23(4):349-360, 2001. Effectively, the feature in each segmented object is processed the same as features in objects Felzenszwalb et al., "Pictorial structures for object recognition," Intl. J. of Computer Vision, volume 61, 2005; and Felzenszwalb et al., "A discriminatively trained, multiscale, deformable part model," Proc. IEEE Conf. on Computer Vision, 20089.

In all cases, the prior art features are fixed within objects and as well as segmented objects. In some cases the objects are the features. The features are not displaceable within the objects or segmented objects, as defined herein.

Fixed features work well when the physical features of the object, e.g., the eyes in the case of a face, occupy the same relative physical location and size. However, if the object is deformable or the features are otherwise displaced as in articulated objects, the problem becomes much harder. In fact, object detection is only tractable when the features are fixed, otherwise the search space becomes problematic.

Therefore, it is desired to normalize displaceable features and descriptors within objects.

SUMMARY OF THE INVENTION

In many prior art image processing methods, models are constructed from features of the object. In that context, features of the object are defined as regions with a fixed relative location and fixed size with respect to the image window of the object. For example, in face detection and recognition, it is assumed that features, such as the eyes, nose and mouth, have fixed relative locations and sizes. The same can be said for detecting human heads. It is generally assumed that the head is above the torso. However, this is not always correct.

Therefore, the invention normalizes displaceable features. We use the "plain meaning" for displaceable: "to move physically out of position." That is, features are not always were one expects them to be. Displaceable features can dynamically change their relative location and size in various images.

When the displaceable features are normalized according to the embodiments of the invention, they perform better than conventional fixed features, as in the prior art, especially for tasks such as object detection and recognition.

DETAILED DESCRIPTION OF THE PREFERRED EMBODIMENT

Displaceable Features

The embodiments of our invention provide a method for normalizing displaceable features. Again, we emphasize that we use the plain meaning for displaceable: "to move physically out of position." That is, the features do not have a fixed relative location, rather the feature can move physically out of position with respect to each other. Consequently, the features can be displaced in the object as observed in images. More specifically, we define a displacement zone Z within the object within which the feature can be displaced. The displacement zone can be defined by transformation parameters, including similarity, affine, and perspective motion transformations.

The normalized displaceable features improve common vision applications, such as object detecting, recognizing, classifying and tracking. It should be understood that our method is general and can be applied to features of any deformable object or articulated object of multiple parts.

We provide two embodiments to normalize displaced features. A first embodiment determines the best location using an iterative search process and a cost function. A second embodiment uses a direct mapping to displace the feature to the best location.

The main advantage of our displaceable feature-based models is the automatic selection of representative features. We do not need to know what the underlying physical features are. Therefore, we do not assume the availability of ground truth annotation for our features. Hence, we train models of displaceable features based only on information available in training data.

Figure 1:
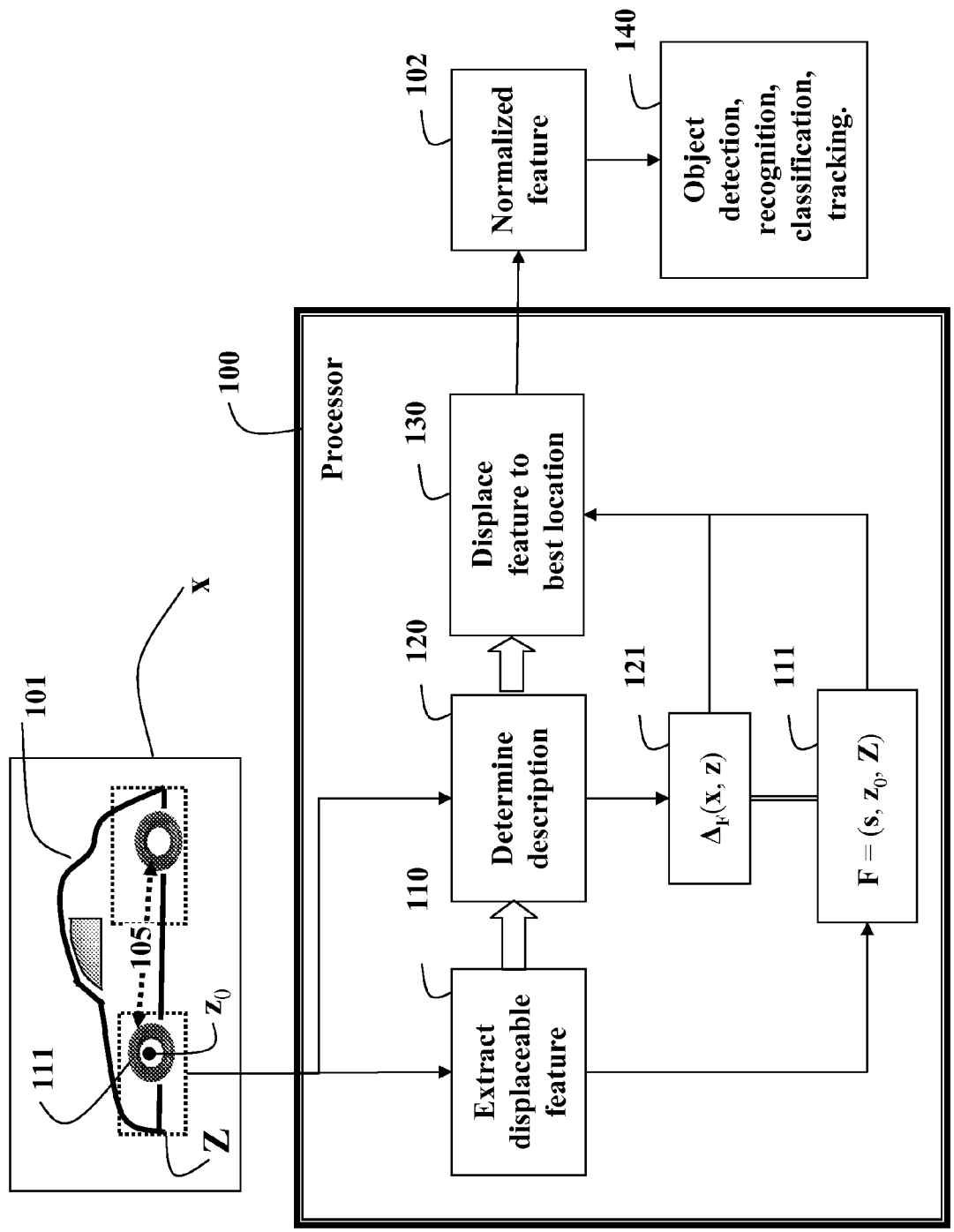
FIG. 1 is a block diagram for a method for normalizing displaceable features of objects in images.

FIG. 1 shows a method for normalizing features (wheels) 111 of an object (vehicle) 101 in an image x according to embodiments of our invention. The steps of the method are performed in a processor 100. The processor includes memories and input/output interfaces as known in the art. Although, the example images described herein are two dimensional, it is understood that three dimensional images, such as volumetric data and medical scans can also be used.

The displaceable feature (wheel) 111 is extracted 110 from an image x. For the purpose of this invention the fact that the wheel can move (rotate) is irrelevant. We are only concerned with the fact that, although wheels are arranged somewhere in a displacement zone Z along the bottom of the vehicle, the relative displacement 105 of the wheels with respect to the front, back and bottom of the vehicle in arbitrary images can vary.

The feature 111, F=(s, $z_0$, Z), has a size s, a location $z_0$, and with the displacement zone Z in which the feature is allowed to be displaced. A size of the displacement zone Z is about double the size of the feature in both dimensions, with a boundary a maximum of sixteen pixels away from the feature.

We determine 121 an associated descriptor of the feature in the image x at location z in the displacement zone Z as $\Delta_F$(x, $z_0$) 121.

In the preferred embodiment, we use a histogram of oriented gradients (HOG) of the feature for the descriptor. Each histogram contains bins representing nine ranges of orientation directions. Each pixel contributes to two bins of the histogram by dividing the gradient magnitude between the two bins by bi-linear interpolation. Each pixel also contributes to the four quadrants with bilinear interpolation. The descriptors can be determined by using integral histograms and kernel integral images, see e.g., U.S. Patent Application 20070237387, incorporated herein by reference. Other appearance based descriptors include edges, lines, pixel-wise filter responses, region templates, and statistical descriptors including region covariances, intensity histograms and co-occurrences. In one embodiment, the descriptors are normalized.

For our descriptor, we use a scale-invariant feature transform (SIFT). The SIFT features are local and based on the appearance of the object at particular locations, and are invariant to image scale and rotation. SIFT features are insensitive to changes in illumination, noise, and minor changes in viewpoint. In addition to these properties, SIFT features are highly distinctive, relatively easy to extract, and allow for correct object identification with low probability of mismatch. Henceforth, we omit the variable x for simplicity.

Data Driven Displacement by Iterative Searching

Figure 2:
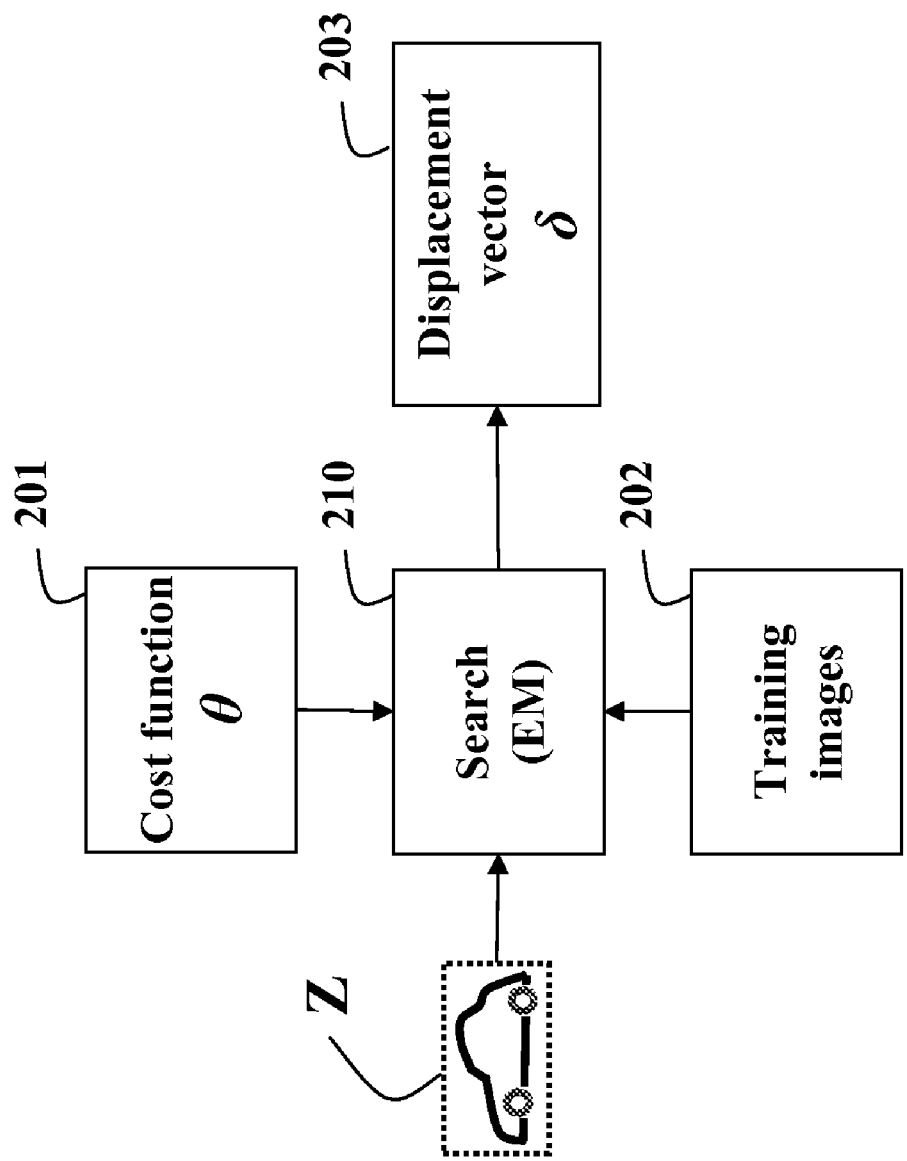
FIG. 2 is a block diagram of a process for searching for a best location for the feature according embodiments of the invention.

As shown in FIG. 2, one way we can displace 130 the feature is by searching for the best location z* in the displacement zone Z by evaluating a cost function θ 201. In this embodiment, we use a trained set of images 202 with features at various locations. Each location has a corresponding descriptor. The cost function is evaluated using the corresponding descriptor of the training images, and the descriptor $\Delta_F$ associated with the feature F at the location $z_0$ in the displacement zone.

The cost function θ($\Delta_F$, z) measures a likelihood a descriptor at a location in a given training image matches the descriptor of the feature F at the location $z_0$. In other words, the cost function measures a likelihood the object in the image is in a class of objects corresponding to the training images. The best location maximizes the likelihood score, which might require moving away from the location $z_0$ by a shift vector δ 203. Because though the cost function θ is on the description $\Delta_F$(z) and the location z, even though $\Delta_F$ is a function of z we can model the case when a prior probability of the location z is not uniform. In a probabilistic setting, this is equivalent to finding a maximum a priori estimate of the location of the feature. The iterations can terminate when a difference of successive estimates is less than a predetermined threshold, or after a predetermined number of iterations.

An initial approximation $θ_0$ of the cost function assumes the feature is located at the location $z_0$ in all training images. Thus, the initial scoring function θ is expected to model an approximate appearance of the feature. The search uses a expectation maximization (EM) procedure, which alternates between an estimating and maximizing step $$z^* = \underset{z \in Z}{\operatorname{argmax}} \theta(\Delta_F(z)),$$

and $$\theta^* = \theta(\Delta_F(z^*)).$$

This process locates the best location z* by maximizing the cost function.

We use four steps in each direction to search for the best location. In practice, this can be very time consuming.

Parametric Direct Displacement by Mapping Function

Figure 3:
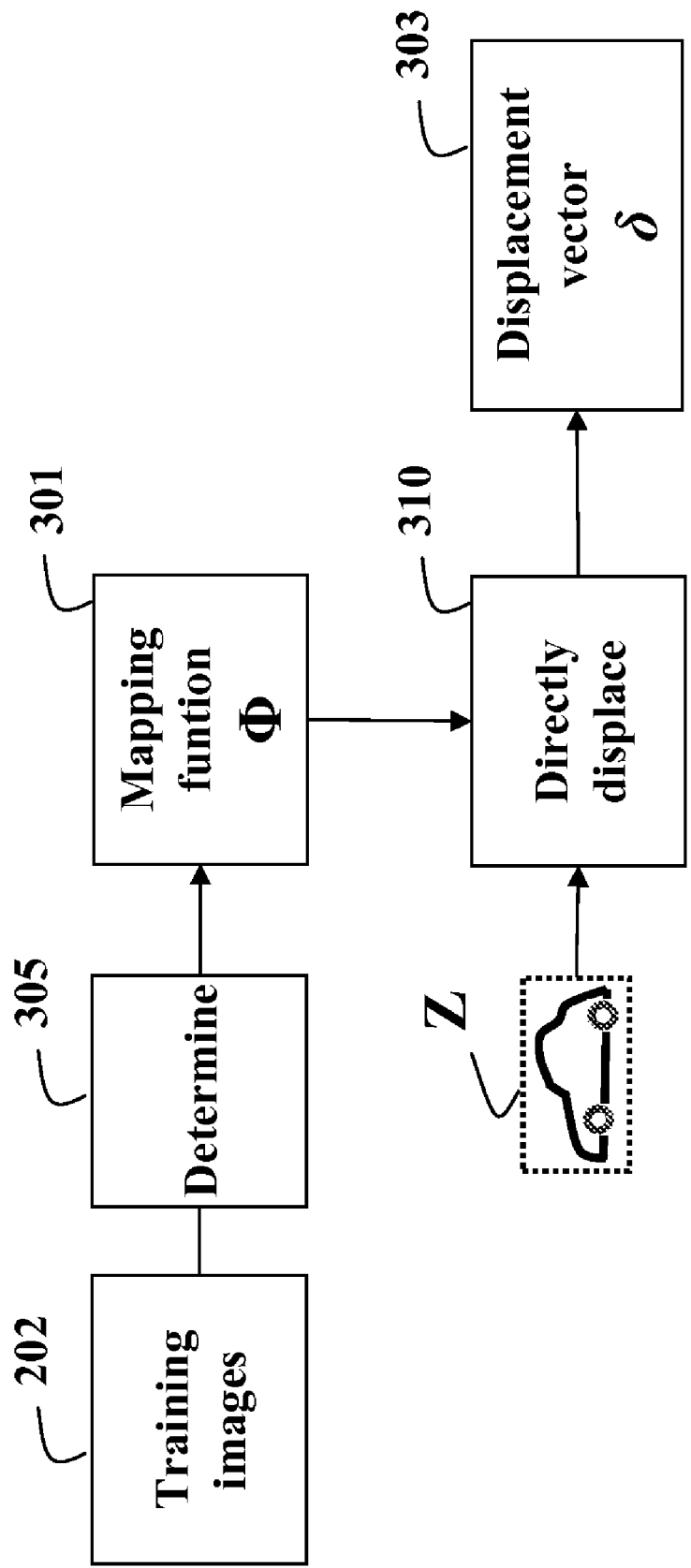
FIG. 3 is a block diagram for directly displacing the feature according to the embodiments of the invention.

In this embodiment, as shown in FIG. 3, we directly move to the best location using a displacement vector δ=z*−$z_0$. To make the displaceable feature move directly to the best location, we utilize an estimation of the best feature locations on the training images 202 to determine a mapping 305 function Φ 310 from the descriptor $\Delta_F$(z) at the location to the shift vector δ using $$z'=z_0+\Phi(\Delta_F(z_0)),$$

$$\theta'=\theta(\Delta_F(z')),$$

where z' and θ' are the best location obtained using the mapping function and the new scoring function result at the new location. The mapping function can be characterized as a regression function that directly maps the location of the feature to the best location.

Training a Normalized Classifier for Displaceable Features

In boosted classifiers, weak and strong classifiers are terms of art, and not meant to be indefinite, as in their common meaning. A weak classifier is only slightly correlated with a true classification, while a strong is arbitrarily well correlated with the true classification. Most boosting processes iteratively learning weak classifiers with respect to a distribution of features to be classified, and adding the weak classifiers to form a strong classifier. The weak classifiers are weighted according to their classification accuracy. One well known boosted classifier is AdaBoost. AdaBoost is adaptive in the sense that subsequent weak classifiers are weighted in favor of features misclassified by previously added classifiers.

Our classifier can be designed for use with displaceable features as described above.

We use several variants of boosting, including assembling binary thresholded weak classifier responses, and fitting a scalar valued function to the training images by assigning identical weights and probabilities to each image in the set of training images.

During training, we select a set of displaceable features in the displacement zone in each training image. The features can have arbitrary shapes and sizes. Each displaceable feature is normalized according to its location and description, as described above.

To select the best normalized displaceable feature, we evaluate the features in terms of a residual minimization score. For each feature, we determine a response and weights using a weighted least-squares regression. The weights are determined using the probability of the current feature, and the responses are the label approximation terms scaled, by the weights. Then, we determine the scoring function values, and fit a function by a weighted least squares regression of the locations of the feature locations.

For each normalized displaceable feature in the set, we determine a residual that indicates the improvement in the performance of the classifier. We select the feature that has the lowest residual, i.e., the highest aggregated detection score. Then, we update the classifier response function that accumulates the individual responses of the previously selected normalized displaceable features, and revise the probability of each training feature. The displaceable feature selection continues until a desired performance is reached.

During subsequent operation, we determine the response of the classifier for each normalized displaceable feature. A sign of the response of the classifier is assigned as the detection result.

EFFECT OF THE INVENTION

We describe displaceable features that can be used to improve computer vision applications, such as object detection, recognition, classification, and tracking, that rely on significant features of objects. The advantage of displaceable features over conventional fixed features is the ability to select the best location for the feature, in a small neighborhood, that best fits model of the feature. In addition, we can select a dynamic number of features instead of selecting a fixed number as in part models. Also, are feature models is well suited for parallel implementation in graphic processing units.

We believe this property makes our displaceable features better for complicated object structures and deformations than fixed location features.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for normalizing a feature of an object in an image, comprising a processor for performing steps of the method, comprising:
    extracting the feature of the object from the image, wherein the feature is displaceable within a displacement zone in the object, and wherein the feature has a location within the displacement zone;
    determining an associated description of the feature; and
    displacing the feature to a best location in the displacement zone to produce a normalized feature;
    searching a set of training images iteratively for the best location, wherein the searching uses a cost function;
    wherein the feature is $F=(s, z_o, Z)$, wherein a size of the feature is s, the location is $z_o$, and the displacement zone is Z, and wherein the descriptor is $\Delta F(x, z_o)$, and the cost function $\theta(\Delta F, z)$ measures a likelihood a descriptor at a location in a given training image matches the descriptor of the feature F at the location $z_o$, and wherein x is the image from which the descriptor is extracted.

2. The method of claim 1, wherein the displaceable feature is used for detecting, recognizing, classifying or tracking the object.

3. The method of claim 1, wherein the object is rigid, deformable or articulated.

4. The method of claim 1, wherein the cost function maximizes a likelihood score.

5. The method of claim 1, wherein the cost function $\theta$ measures a likelihood the object in the image is in a class of objects corresponding to the training images.

6. The method of claim 1, further comprising:
    determining the descriptors $\Delta_F(x, z_0)$ for each training image.

7. The method of claim 1, wherein the iterations terminate when a difference of successive estimates of the cost function is less than a predetermined threshold.

8. The method of claim 1, wherein the iterations terminate after a predetermined number of iterations.

9. The method of claim 1, further comprising:
    applying a mapping function to directly displace the feature to the best location.

10. The method of claim 9, wherein the mapping function determines a displacement vector $\delta=z^*-z_0$, where $z^*$ is the best location and $z_0$ is the location of the feature.

11. The method of claim 9, further comprising:
    determining the mapping function from a set of training images.

12. The method of claim 1, wherein the feature is $F=(s, z_0, Z)$ with a size s, a location $z_0$, and a displacement zone Z.

13. The method of claim 12, wherein the descriptor is $\Delta_F(x,z_0)$ where x is the image from which the descriptor is extracted.

14. The method of claim 1, wherein the displacement zone is defined by transformation parameters including similarity, affine, perspective motion transformations.

15. The method of claim 1, wherein the descriptor uses a histogram of oriented gradients of the feature.

16. The method of claim 1, wherein the image is three dimensional.

17. The method of claim 1, further comprising:
    normalizing the descriptor.

18. The method of claim 1, wherein the descriptor uses appearance based descriptors including edges, lines, pixel-wise filter responses, region templates, and statistical descriptors including region covariances, intensity histograms and co-occurrences.

* * * * *